(12) United States Patent
Onishi (10) Patent No.: US 7,805,936 B2
(45) Date of Patent: Oct. 5, 2010

(54) THERMO-ELEMENT

(76) Inventor: Yukio Onishi, 2357-19, Azashinkawa, Ishigakishi, Okinawa 9070024 (JP)

( * ) Notice: Subject to any disclaimer, the term of this patent is extended or adjusted under 35 U.S.C. 154(b) by 0 days.

(21) Appl. No.: 12/405,180

(22) Filed: Mar. 16, 2009

(65) Prior Publication Data

US 2009/0178402 A1 Jul. 16, 2009

Related U.S. Application Data

(63) Continuation of application No. PCT/JP2006/318434, filed on Sep. 19, 2006.

(51) Int. Cl.
  *F01B 29/10* (2006.01)
  *F02G 1/04* (2006.01)
  *G05D 23/02* (2006.01)
(52) U.S. Cl. ..................... 60/527; 236/101 R
(58) Field of Classification Search .............. 60/508, 60/527, 528; 236/99 K
See application file for complete search history.

(56) References Cited

U.S. PATENT DOCUMENTS

| | | | | |
|---|---|---|---|---|
| 2,881,616 A | * | 4/1959 | Clifford et al. | 60/527 |
| 3,016,747 A | * | 1/1962 | Vernet | 60/527 |
| 3,064,477 A | * | 11/1962 | Vernet | 60/527 |
| 3,080,756 A | * | 3/1963 | Baker | 60/527 |
| 3,308,668 A | * | 3/1967 | Wong | 60/527 |
| 3,357,252 A | * | 12/1967 | Vernet | 60/527 |
| 3,403,559 A | * | 10/1968 | Janous | 60/527 |
| 3,407,663 A | * | 10/1968 | Vernet | 60/527 |
| 3,591,075 A | * | 7/1971 | Onishi | 236/34 |
| 4,561,913 A | * | 12/1985 | Zado | 148/23 |
| 5,033,865 A | * | 7/1991 | Kuze | 374/160 |
| 5,119,061 A | * | 6/1992 | Kuze | 337/393 |
| 5,177,963 A | * | 1/1993 | Kuze | 60/327 |
| 5,509,269 A | * | 4/1996 | Kuze | 60/527 |

(Continued)

FOREIGN PATENT DOCUMENTS

JP   S 55-145330   10/1980

(Continued)

OTHER PUBLICATIONS

International Search Report for PCT Counterpart Application No. PCT/JP2006/318484 (Dec. 5, 2006).

*Primary Examiner*—Thomas E Denion
*Assistant Examiner*—Christopher Jetton
(74) *Attorney, Agent, or Firm*—Blakely Sokoloff Taylor & Zafman LLP (57) ABSTRACT

To provide a thermo-element having a simple structure, an improved durability and a good response characteristic, by improving heat conduction of wax and by improving a diaphragm. The wax is blended with small pieces of metal, and a low-melting point alloy having a melting point equal to or higher than a melting point of the wax, which are melted and mixed together in the wax, so as to improve the heat conduction and thus response characteristic of the wax. A thick sealing member comprises a piston insertion bore formed in a central portion thereof, a thick portion between the piston insertion bore and a sealing portion in an outer peripheral region the thick portion being easily deformable. The thick sealing member operates both as a diaphragm and as a gummy fluid in a prior art thermo-element. A thermo-element has a small number of components, a simple structure.

5 Claims, 6 Drawing Sheets

U.S. PATENT DOCUMENTS

| | | | | |
|---|---|---|---|---|
| 5,816,493 A | * | 10/1998 | Pirkle | 236/101 R |
| 5,967,410 A | * | 10/1999 | Lammers | 236/93 R |
| 6,988,364 B1 | * | 1/2006 | Lamb et al. | 60/508 |

FOREIGN PATENT DOCUMENTS

| | | |
|---|---|---|
| JP | 01-182685 | 7/1989 |
| JP | 05-296140 * | 11/1993 |
| JP | 07-006675 | 1/1995 |
| JP | 07-098390 | 4/1995 |
| JP | 09-089153 | 3/1997 |

* cited by examiner

THERMO-ELEMENT

CROSS-REFERENCE TO RELATED APPLICATION

This is a continuation of prior International Patent Application No. PCT/JP2006/318484, filed on Sep. 19, 2006, which is incorporated by reference in its entirety.

FIELD OF THE INVENTION

The present invention relates to a thermo-element, or a thermo-actuator, using expansion and contraction of wax by a temperature change.

DESCRIPTION OF THE PRIOR ART

A thermo-element using a thermally expandable component, such as wax or the like, as a temperature sensor has been used conventionally. The thermo-element converts a change in volume of the wax by a temperature change into an axial linear movement of the piston. There are various types of thermo-elements, including a diaphragm-type as shown in FIG. 1 and a sleeve-type as shown in FIG. 2.

Figure 1:
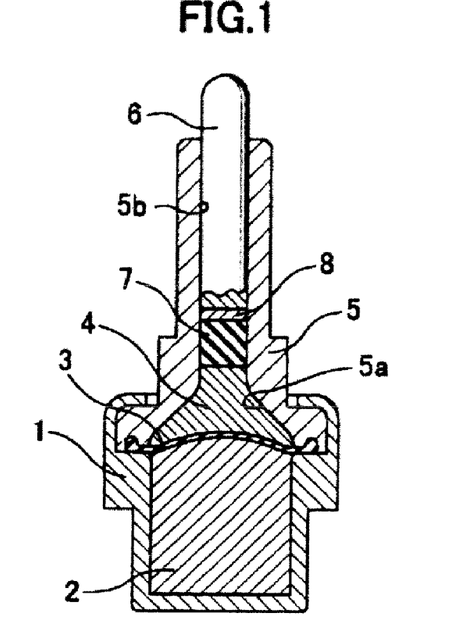
FIG. 1 a longitudinal sectional view of a thermo-element of a diaphragm type according to the prior art.
Figure 2:
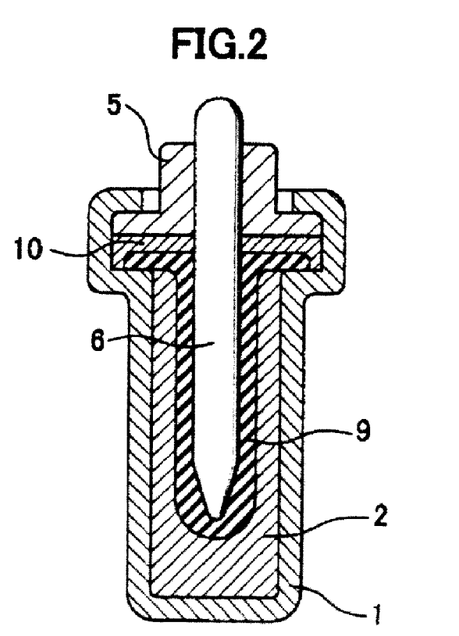
FIG. 2 a longitudinal sectional view of a thermo-element of a sleeve type according to the prior art.

A thermo-element of the diaphragm-type as shown in FIG. 1 includes a cylindrical casing 1 having a bottom, and a cylindrical guide member 5 connected to the casing 1. An inside space of the casing 1 is filled with a volume of wax 2, and a diaphragm 3 seals the upper surface of the wax 2. A gummy fluid 4 is filled between a contact surface 5a in the base end portion of the guide member 5 and an upper side of the diaphragm 3, the gummy fluid 4 being a deformable non-compressible fluid. Within the guide tube 5b of the guide member 5, a rubber piston 7, a protective sheet 8 and a piston 6 are arranged above the gummy fluid 4.

As an ambient temperature rises, the wax 2 expands and thus the diaphragm 3 bulges upward and pushes up the gummy fluid 4 located above the diaphragm 3. The gummy fluid 4 is deformed and enters into the guide tube 5b and pushes the piston 6 upward via the rubber piston 7 and the protective sheet 8. As the temperature decreases, the wax 2 contracts, and then a load (not shown) applied to the piston 6 can press the piston 6 downward. In this way, the piston 6 can move in and out of the guide member 5 when the temperature changes.

As used in this specification, the term "up" refers to the upward direction and the term "down" the downward direction in the attached drawings.

A thermo-element of the sleeve-type as shown in FIG. 2 includes a cylindrical casing 1 having a bottom, a wax 2 filled in the casing, and a sleeve 9 which seals an upper end portion of the wax 2. An upper side of the sleeve 9 is connected to the casing 1 via a retaining plate 10. A cylindrical guide member 5 is provided at the upper end portion of the casing 1. The base end portion of the guide member 5 is connected to the upper end portion of the casing 1. A piston 6 is provided which extends from the inside of the sleeve 9 and through the guide member 5.

As an ambient temperature rises, the wax 2 expands and thus pushes and deforms the sleeve 9, which in turn pushes out the piston 6 inserted in the sleeve 9 upwardly. As the temperature decreases, the wax 2 contracts, then a load (not shown) being applied to the piston 6 can press down the piston 6 back to its previous position. In this way, the piston 6 can be moved in and out of the guide member 5 when the temperature changes.

In the thermo-element of the diaphragm type, the expansion of the wax can be directly converted via the diaphragm and the gummy fluid into the linear movement for pushing up the piston. Thus, the thermo-element of the diaphragm type has an advantageous effect, namely, a good response characteristic. However, there is a problem that the gummy fluid may leak from the portion of the rubber piston which seals the gummy fluid, and in this case thus the thermo-element of the diaphragm type is easily deteriorated and thus not durable.

In the thermo-element of the sleeve type, the expansion of the wax presses and deforms the sleeve and thus it is indirectly converted into a linear movement of pushing up the piston. Thus, the thermo-element of the sleeve type has a poor response characteristic.

Both of the thermo-element of the diaphragm type and that of the sleeve type have another problem that the heat conduction of the wax is not good. Typically, the wax is blended with small pieces of metal having higher heat conduction, such as fragments of copper foil, in order to improve the heat conduction. The metal in the form of powder, tip and foil, collectively referred to as the small pieces, may be blended in the wax. However, the wax, even if blended with the small pieces of metal, can not provide sufficiently high heat conduction. Especially, as the wax in a solid state at a lower temperature is heated and accordingly its temperature rises, the wax is softened and allows the heat to be transferred sequentially from the outside thereof.

Figure 3:
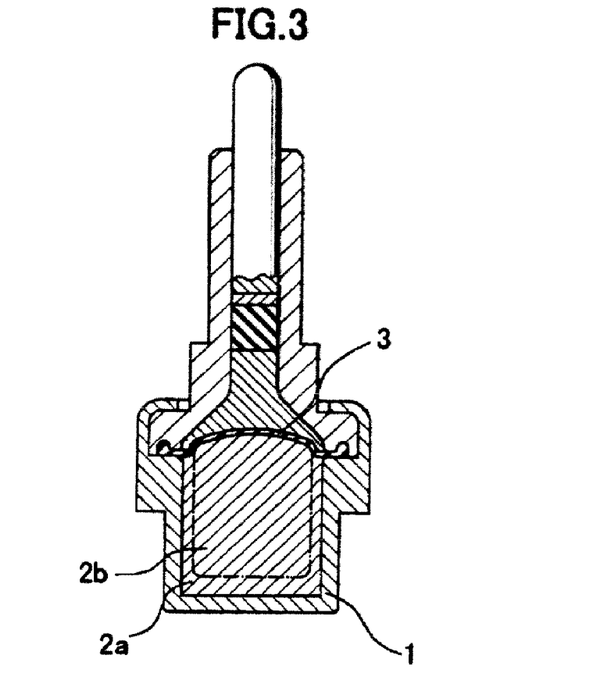
FIG. 3 a longitudinal sectional view of the thermo-element of the diaphragm type, illustrated to show a state where the wax has partially melted.

If the heat conduction of the wax is not good, when the temperature of the casing increases, the wax adjacent to an inner surface of the casing may melt and expand, while the wax located at the center portion of the casing may remain in a solid state. For the thermo-element of the diaphragm type, the wax 2a adjacent to the inner surface of the casing will melt as shown in FIG. 3 while the wax 2b located at the center portion of the wax 2a is in a solid state. Thus, the wax 2b pushes up the diaphragm 3, and the deterioration of the diaphragm 3 is accelerated.

Figure 4:
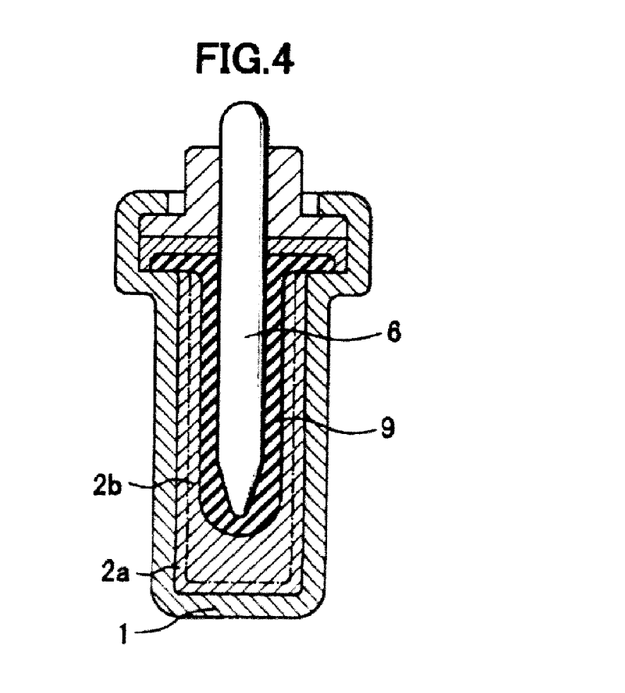
FIG. 4 a longitudinal sectional view of the thermo-element of sleeve type, illustrated to show a state where the wax has partially melted.

For the thermo-element of the sleeve type, the wax 2a adjacent to the inner surface of the casing may melt as shown in FIG. 4, while the wax 2b at the center of the casing is left in a solid state, and thus the sleeve 9 can not be pressed up. Thus, the piston 6 can not be squeezed out of the cylindrical guide member. Thus, a pressure inside the casing could be high, and thus the response delayed.

Various improvements have been made to the thermo-elements of the above types. The Patent document 1 discloses a structure of the thermo-element of the diaphragm type, which uses solid particulates instead of the gummy fluid in order to prevent the gummy fluid from escaping from the sealing portion and thus to improve the durability.

However, the thermo-element in the Patent document 1 has a drawback that the solid particulates do not flow well and resistance to deformation is high.

The Patent document 2 discloses a structure of the thermo-element of the sleeve type, which uses a rubber seal spool (a sleeve) and a rubber seal linear tube (a bellow) that is connected to be abutted to the sleeve, a rod (a piston) inserted into respective central bores of both the above sleeve and piston, and a lubrication oil filled in the space below the rod. As a result, the response characteristic and the durability of the thermo-element are improved.

However, in the thermo-element of the patent document 2, the bellow is repeatedly expanded and contracted, and thus there is a drawback that it is easily deteriorated and the structure is complex.

For the above reasons, a thermo-element in which the wax has improved heat conduction is desired. A thermo-element that has a simple structure, an improved durability as well as a good response characteristic is also desired.

Reference

[Patent document 1] JP H 07-6675
[Patent document 2] JP H 09-89153

SUMMARY OF THE INVENTION

Problem to be Solved by the Invention

An object of the present invention is to provide a thermo-element in which wax has an improved heat conduction.

Another object of the present invention is to provide a thermo-element having a simple structure, an improved durability and a good response characteristic.

Means to Solve the Problem

The present invention, in a first aspect (claim 1), provides a thermo-element comprising a thermally expandable component filled in a casing, said component being made of a wax which is expandable and contractible by a temperature change, and an elastic sealing member which seals an opening of said casing, expansion and contraction of said wax causing a piston to move in and to move out, wherein:

said wax serving as the thermally expandable component is a wax mixture including small pieces of metal and a low-melting point alloy having a melting point equal to or higher than a melting point of said wax, both the small pieces of metal and the low-melting point alloy being melted and mixed together in said wax.

Preferably, the elastic sealing member is a diaphragm or a sleeve.

Preferably, the small pieces of metal are metal powder or metal foil.

The heat conduction of the wax is improved. A temperature difference between an outer region and an inner region of the wax filled in the casing of the thermo-element is reduced. Thus, the all of the wax can melt and expand substantially evenly, and thus presses the sealing member, such as the diaphragm and the sleeve, uniformly. As a result, the degrading of the diaphragm can be avoided, and the diaphragm responds quickly.

The present invention, in another aspect (claim 4), provides a thermo-element including a thermally expandable component made of a wax which is expandable and contractible by a temperature change, and expansion and contraction of said wax causing a piston to move in and to move out, said thermo-element comprising:

a cylindrical casing, one end portion thereof being open for enclosing said wax therein;

a cylindrical guide member which engages said one end portion of said casing;

a piston held inside said guide member so that said piston can slide freely; and a thick sealing member arranged between said guide member and said wax for enclosing said wax in said casing and for moving-in and moving-out said piston, wherein said thick sealing member is formed of a rubber elastomer;

said thick sealing member has a piston insertion bore formed in a central portion thereof for supporting one end portion of said piston;

said thick sealing member has a thin portion at an end portion of said piston insertion bore, an annular rib arranged at an outer peripheral region for sealing said wax and a thick portion having a high thickness between said thin portion and said rib;

one surface of said thick portion is in contact with a contact surface of a base of said guide member and the other surface of said thick portion is in contact with said wax; and as said wax expands by a temperature change, said thick portion and said thin portion of said thick sealing member are deformed and thus push up said piston.

The thick sealing member functions both as a diaphragm that can be deformed and seals the gummy fluid and also as a gummy fluid operable to push the piston. The diaphragm and the gummy fluid are used in the thermo-element in according with the prior art. The thermo-element of the present invention can eliminate the need for a rubber piston and a protective sheet, which have been required in the conventional thermo-element, and can obtain a thermo-element having a simple structure and gummy fluid which does not leak.

The wax (thermally expandable component) may be a wax mixture including small pieces of metal, such as metal powder, metal foil and the like, and a low-melting point alloy having a melting point equal to or higher than a melting point of the wax, both the small pieces of metal and the low-melting point alloy being melted and mixed together in the wax.

A thermo-element is obtained which has a further improved response characteristic and a simple and inexpensive structure is obtained.

The present invention, in yet another aspect (claim 6), provides a thick sealing member used in a thermo-element, wherein a wax expandable and contractible by a temperature change is used as a thermally expandable component, and expansion and contraction of the wax causes a piston to move in and to move out, said thick sealing member:

being composed of a rubber elastomer; and including a piston insertion bore formed in a central portion thereof for supporting one end portion of said piston;

a thin portion at an end portion of the piston insertion bore;

an annular rib arranged at an outer peripheral region; and a thick portion having a high thickness between the thin portion and the rib, wherein the thick portion and the thin portion are deformable by the pressure from the wax and thus push up the piston.

Preferably, the thick sealing member is axially symmetrical.

Preferably, the rib and an upper surface of the thick portion of the thick sealing member are formed of a high-hardness rubber in a range of Hs 60-80 and the rest of the thick sealing member is formed of a low-hardness rubber in a range of Hs 2-40, which rubbers are integrally formed into the thick sealing member. More preferably, a low-hardness rubber is in a range of Hs 10-40.

Preferably, an inner surface of the piston insertion bore of the thick sealing member is also formed of a high-hardness rubber in a range of Hs 60-80.

Preferably, the rib and a lower surface of the thick portion of the thick sealing member are formed of a high-hardness rubber in a range of Hs 60-80 and the rest of the thick sealing member is formed of a low-hardness rubber in a range of Hs 2-40, which rubbers are integrally formed into the thick sealing member.

Effect of the Invention

The thermo-element of the present invention uses a wax mixture including small pieces of metal and a low-melting point alloy having a melting point equal to or higher than a melting point of the wax, both the small pieces of metal and the low-melting point alloy being melted and mixed together in the wax. Thus, the heat conduction of the wax mixture is significantly improved. Therefore, a temperature difference between the outer region and the inner region of the wax mixture filled in the thermo-element is reduced. As a result, not only does the wax adjacent the inner surface of the casing melt and expand, but all of the wax including the center portion thereof can melt and expand almost uniformly, and thus a pressure is apply to the sealing member, such as the diaphragm and the sleeve, uniformly. Thus, the problem of degrading of the diaphragm is resolved and the response of the thermo-element will not be delayed.

Further, in the present invention, a piston insertion bore is formed in a central portion of the thick sealing member, and an easily deformable thick portion is formed having a high thickness between the piston insertion bore and the rib arranged in an outer peripheral region of the thick sealing member for sealing the wax. As a pressure is applied to the thick sealing member, the thick portion is deformed to apply a force in the direction for pushing the piston. Thus, the structure of the thermo-element can be simplified and the gummy fluid will not leak.

DESCRIPTION OF THE PREFERRED EMBODIMENTS

Preferred embodiments of the present invention will now be described with reference to the attached drawings.

A first embodiment of the present invention is directed to improve thermal conductivity of wax used in a thermo-element by blending the wax with small pieces of metal in the form of metal powder or metal foil and a low-melting point alloy having a melting point equal to or higher than a melting point of the wax, both the small pieces of metal and the low-melting point alloy being melted and mixed together in the wax. The configuration of the thermo-element may be the diaphragm type as illustrated in FIG. 1 or the sleeve type as illustrated in FIG. 2.

Paraffin wax is typically used for an expandable component of the thermo-element. In order to provide an expansion property suitable for each specific application, some types of wax having different melting temperatures being melted and mixed together. Typically, small pieces of copper are mixed together for improving the heat conduction of the wax. The copper may usually be mixed in the form of small pieces, such as pieces of copper foil, not copper powder. This is because if the copper is mixed in the form of powder, the copper powder could precipitate after the wax is fused and coagulate repeatedly.

As the amount of the copper foil to be mixed in the wax increases, the heat conduction of the wax will be gradually improved. It is known that the heat conduction can be dramatically improved when the amount of copper foil reaches a certain level (as much as 90 wt %). It is considered that pieces of copper foil contact each other at this level. However, the allowable amount of the copper foil to be added in the wax is limited to around 50 wt % for commercial products. In the wax including the copper foil in the amount for commercial use (around 50 wt %), the individual pieces of copper foil are isolated in the wax, and thus good heat conduction can not be obtained.

In the case where the wax is blended with the copper foil in the amount for the commercial use of the product, if the pieces of copper foil are electrically connected to each other, then the heat conduction would be dramatically improved. Based on this idea, an additional metal other than the copper foil was mixed together in the wax, the additional metal being a binder for binding adjacent pieces of copper foil.

The copper foil in an amount of 30 wt % relative to a weight of a wax mixture as a product was prepared, a powder of low-melting point alloy having a melting point higher than the melting point of the wax to be used (a melting point around 70° C.) in an amount of 20 wt % was added, and the mixture was blended. As the low-melting point alloy, an easily melted alloy composed of solder to which Bi was added (Bi 50 wt %, Sn 22 wt %, Pb 28 wt %, melting point at 100° C.). The prepared mixed material was firstly introduced and blended in the melted wax (50 wt %), secondly the wax blended with the mixed material was heated to a temperature higher than the melting point of the low-melting point alloy and then stirred for further mixing. Thus prepared wax mixture was used in the thermo-element of the diaphragm type as shown in FIG. 1. As a result, the response characteristic of the thermo-element to the temperature change could be significantly improved. When the prepared wax mixture was used in the thermo-element of the sleeve type as shown in FIG. 2, a good response characteristic to the temperature change was obtained.

It is considered that pieces of copper foil are bound together by the low-melting point alloy within the wax mixture and form a bonded structure, such as strings or mesh, and thus heat conduction has been dramatically improved. In the illustrated embodiment, the copper foil is used as the metal, and the copper foil and the low-melting point alloy are mixed first, and then the mixture of the copper foil and the low-melting point alloy is mixed with the wax and melted together. However, the invention is not limited thereto. That is, the copper foil may be mixed with the wax, and then the low-melting point ally may be mixed with the wax. Al foil may be used instead of the copper foil.

As the low-melting point alloy, a solder made of tin (Sn) and lead (Pb) may be used, and also an easily melted alloy made of solder to which bismuth(Bi), cadmium(Cd), indium (In), gallium(Ga) and the like are added may be used. In addition, tin alloys, such as Sn—Cu, Sn—Al, Sn—Zn, Sn—Mg and the like, may be used.

The first embodiment is directed to the thermo-element of the diaphragm type or of the sleeve type. However, the invention is not limited thereto. The wax mixture of the present invention including a metal element or a metal foil and a low-melting point alloy may be used in other types of thermo-elements.

Figure 6:
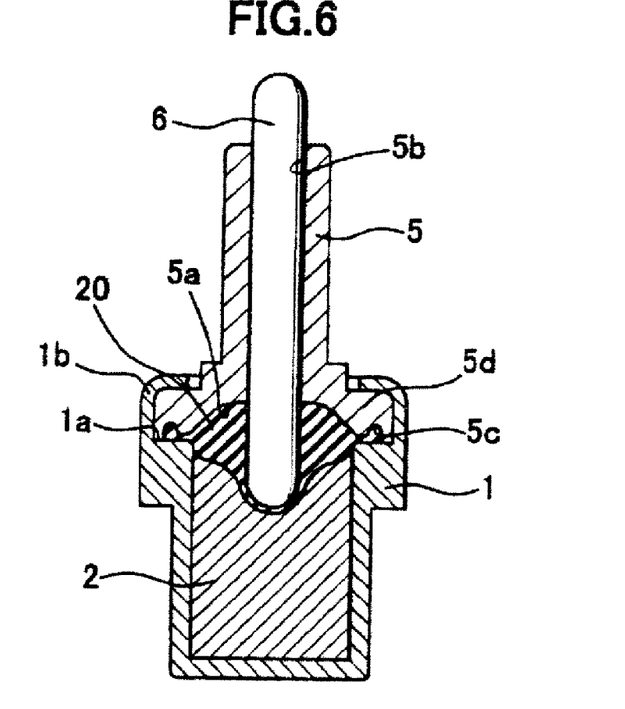
FIG. 6 a longitudinal sectional view of the thermo-element of the second embodiment according to the present invention.

A second embodiment of the present invention will now be described. FIG. 6 shows a longitudinal sectional view of the thermo-element according to the second embodiment of the present invention. In the second embodiment, a thick sealing member 20 is used instead of the diaphragm 3 and the gummy fluid 4 in the prior art thermo-element shown in FIG. 1. Since the second embodiment does not use the gummy fluid 4, the rubber piston 7 and the protective sheet 8 for preventing the leakage of the gummy fluid 4 can be eliminated.

Figure 5:
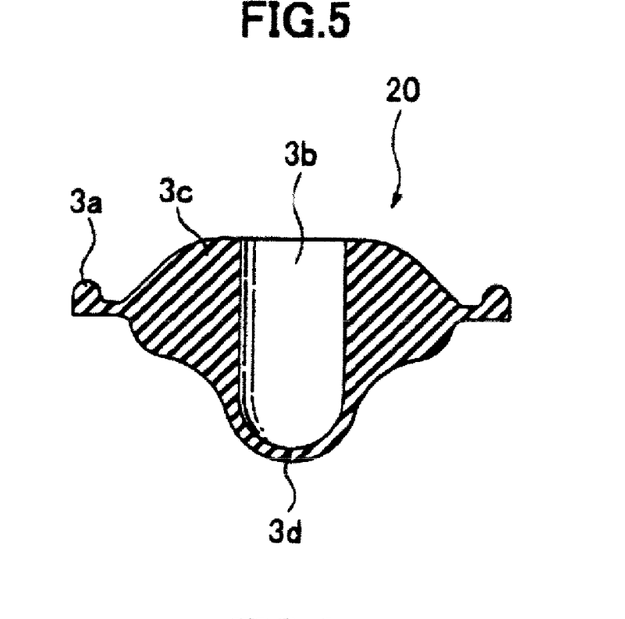
FIG. 5 a longitudinal sectional view of a thick sealing member used in a thermo-element of a second embodiment according to the present invention.

FIG. 5 is a longitudinal sectional view of the thick sealing member 20 used in the thermo-element of the second embodiment. The thick sealing member 20 is axially symmetrical and has a piston insertion bore 3b for inserting a piston 6 formed in a central portion of the thick sealing member, which bore has an inner diameter substantially equal to an outer diameter of the piston. A bottom of the piston insertion bore 3b is a thin portion 3d having a thin thickness, which receives a lower end portion of the piston. An annular rib 3a is formed in an outer peripheral region of the thick sealing member 20 for sealing the wax. A portion between the piston insertion bore 3b and the rib 3a is a thick portion 3c, which has a high thickness. The portion adjacent the piston insertion bore 3b is thick, the thickness becoming thinner away from the center. The upper side of the thick portion 3c (facing the guide member) has a shape conforming to the contact surface 5a, or the lower surface, of the guide member 5. The lower side of the thick portion (facing the wax) has a nearly conical shape. In this design, as the wax 2 expands, a force from the wax 2 is applied to the central portion of the thick sealing member 20 in the upward direction.

The thick sealing member 20 needs to be made of a material that can provide a seal so as not to allow the wax to penetrate therethrough and can endure an operating temperature of the thermo-element. Further, the thick sealing member 20 should be easily deformable and non-compressible, so that it can push out the piston.

The material used for the thick sealing member may be nitrile rubber (NBR). Further, depending on heat resistance, cold resistance and requirements of the environment where the thick sealing member is used, hydrogenated nitride rubber (HNBR), fluorocarbon rubber (FKM) and silicon rubber (UMQ) may be used for its material.

Reference is again made to FIG. 6. The thermo-element of the second embodiment of the present invention uses the thick sealing member 20 as shown in FIG. 5, the thermo-element further comprising a cylindrical casing 1 having a bottom, a cylindrical guide member 5 and a piston 6.

The casing 1 has a cylindrical portion having a bottom, in which the wax 2 is filled, and a large-diameter portion having a flange configuration having a larger diameter than that of the cylindrical portion. An annular sealing surface 1a is formed internally in the large-diameter portion for sealing the thick sealing member 20. Next to the sealing surface 1a, a cylindrical crimping section 1b is formed for fastening a base 5d of the guide member 5.

The guide member 5 has a guide tube 5b configured to operatively hold the piston so that the piston can slide freely therethrough, and the base 5d which has a larger diameter than that of the guide tube 5b and is adapted to engage the casing 1. The guide tube 5b has a bore having an inner diameter substantially equal to an outer diameter of the piston. A lower surface of the base 5d is a contact surface 5a for contacting the upper surface of the thick sealing member 20, and an annular groove 5c is formed in an outer peripheral region of the lower surface of the base 5d for receiving the rib 3a of the thick sealing member 20.

The rib 3a of the thick sealing member 20 is sandwiched between the sealing surface 1a of the casing 1 and the annular groove 5c of the guide member 5 so as to seal the wax 2.

To assemble the thermo-element, the piston 6 is inserted through the guide tube 5b of the guide member 5 and into the piston insertion bore 3b of the thick sealing member 20. The rib 3a of the thick sealing member 20 is fitted in the groove 5c of the guide member 5. The thick sealing member 20 and the guide member 5 are positioned such that the outer diametrical region of the thick sealing member 20 is placed on the sealing surface 1a of the casing 1, which has been filled with the wax 2. Then, the base 5d of the guide member 5 is engaged with the crimping section 1b of the casing 1 such that the crimping section 1b is deformed to fix the guide member 5, and the guide member 5 and the casing 1 are connected to each other. The wax 2 is sealed between the sealing surface 1a of the casing 1 and the lower surface of the rib 3a of the thick sealing member 20. In this way, the thermo-element can be assembled.

Figure 7:
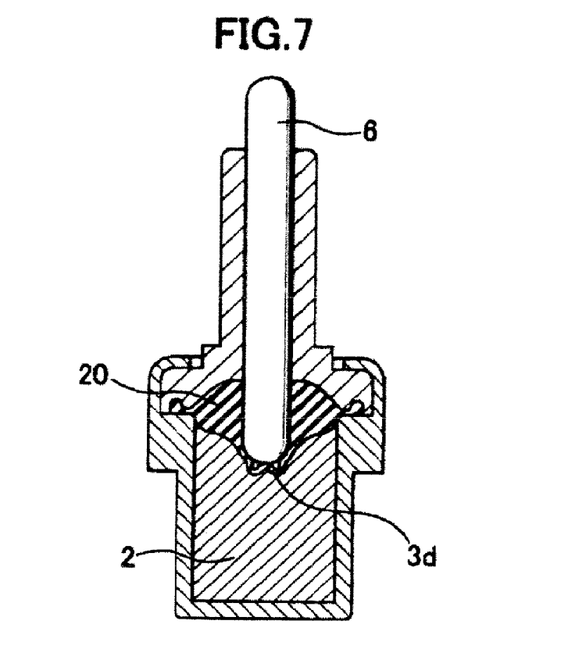
FIG. 7 a longitudinal sectional view of the thermo-element of the second embodiment illustrated to show a state where the wax has expanded.

FIG. 7 shows a longitudinal sectional view of the thermo-element of the second embodiment, illustrating that the wax is expanded as the thermo-element is heated. As discussed above, in the thermo-element, as the temperature rises, the expanded wax 2 exerts a force to the central portion of the thick sealing member 20 in the upward direction. The upper surface of the thick sealing member 20 comes in contact with the contact surface 5a of the guide member 5 and accordingly not allowed to be deformed any further in the upward direction. The most easily deformable thin portion 3d of the thick sealing member 20 is deformed upward to push out the piston 6 upward.

Figure 8:
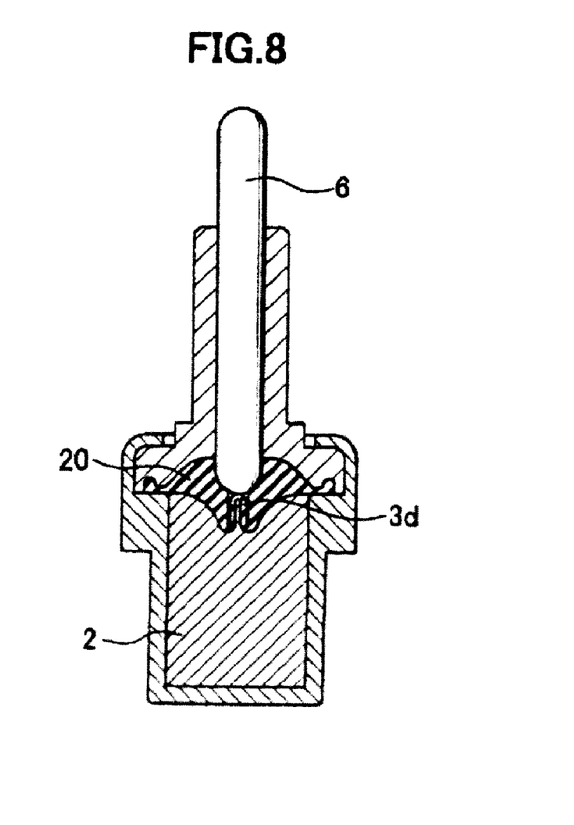
FIG. 8 a longitudinal sectional view of the thermo-element of the second embodiment illustrated to show a state where the was has further expanded.

As the wax 2 expands further, the thick portion 3c is deformed so as to be displaced to the under portion of the piston 6, while the thin portion 3d is deformed convexly further upward so as to push out the piston 6 upward, as shown in FIG. 8.

As the temperature of the thermo-element decreases, the wax 2 contracts and so the thin portion 3d and the thick portion 3c return back to their original configuration shown in FIG. 6 and the piston also returns to its original position.

In order to move the piston 6, the thick portion 3c is preferably soft. However, if the rib 3a is too soft, the sealing property is not enough. Thus, the rubber of the thick sealing member 20 must have an appropriate hardness such that the thick portion 3 may be deformed easily while the rib 3a provides a good sealing property. Preferably, the thick sealing member 20 has a hardness in the range of Hs 40-60. Preferably, the thin portion 3d has a thickness in the range of 0.5 mm to 4 mm.

Figure 9:
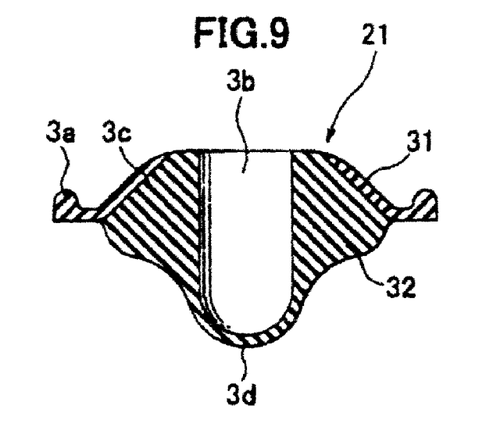
FIG. 9 a longitudinal sectional view of a thick sealing member of a third embodiment of the present invention.

FIG. 9 is a longitudinal sectional view of a thick sealing member 21 according to a third embodiment of the present invention. The configuration of the thick sealing member 21 of the third embodiment is similar to that of the thick sealing member in the second embodiment. A rib 3a and an upper high-hardness portion 31 are made of rubber material of high-hardness, while the most of the portion below the high-hardness portion 31 is a low-hardness portion 32 made of a rubber material of low-hardness which is easily deformable. The high-hardness rubber material and the low-hardness rubber material are bonded together and cured, and thus the thick sealing member composed of a composite rubber material is formed.

A thick sealing member is obtained having the high-hardness portion 31 to contact the contact surface 5a of the guide member 5, the high-hardness portion 31 being configured to have a hardness suitable for providing a sealing effect. The thick sealing member also has the low-hardness portion 32 which is subject to the pressure from the wax 2, the low-hardness portion 32 being configured to be easily deformable so that the piston can be easily moved.

Preferably, the high-hardness rubber material has a hardness in the range of Hs 60-80 (JISK6301). Preferably, the low-hardness rubber maternal has a hardness in the range of Hs 2-40, more preferably in the range of Hs 10-40.

Preferably, the rubber material of the high-hardness portion 31 and that of the low-hardness portion 32 are made of the same rubber material, but having different hardnesses from each other. Or, the rubber material may be of the same type with different hardness from each other. However, the rubber material of difference type from each other may also be used. In addition, preferably, the rubber material of the high-hardness portion 31 and the rubber material of the low-hardness portion 32 may be integrally cured, but they may be separately formed.

Figure 10:
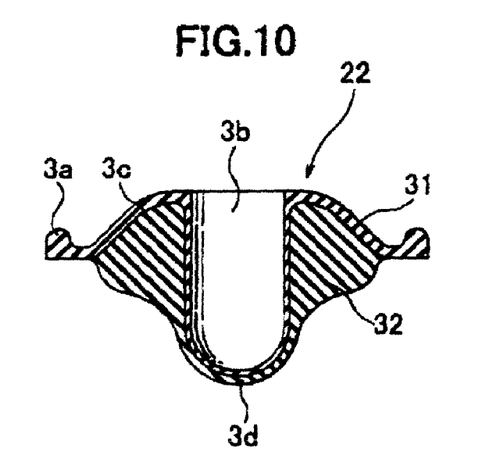
FIG. 10 a longitudinal sectional view of a thick sealing member of a fourth embodiment of the present invention.

FIG. 10 is a longitudinal sectional view of a thick sealing member 22 according to a fourth embodiment of the present invention. The thick sealing member 22 of the fourth embodiment comprises an upper side of the thick sealing member 22 (a rib 3a, a high-hardness portion 31, an inner surface of a piston insertion bore 3b and an upper surface of a thin portion 3d next to the inner surface of the piston insertion bore 3b) made of a high-hardness rubber material, and the rest of the thick sealing member 22 is made of a low-hardness rubber material. The high-hardness rubber material of the upper surface can reinforce the low-hardness rubber material, and thus the durability of the thermo-element is improved.

Figure 11:
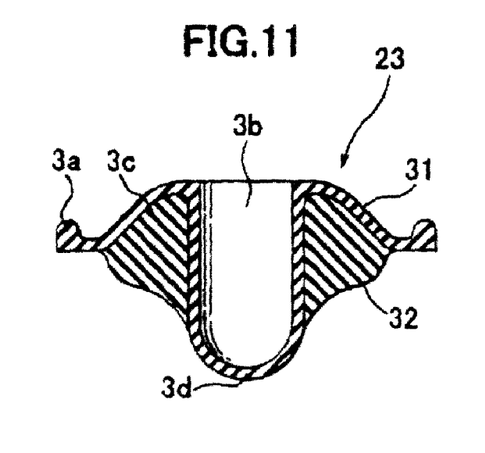
FIG. 11 a longitudinal sectional view of one variation of a thick sealing member of the fourth embodiment of the present invention.

FIG. 11 is a longitudinal sectional view of a thick sealing member 23 according to a variation of the fourth embodiment of the present invention. In the thick sealing member 23 according to this variation, not only an upper surface of a thin portion 3d but also a lower surface of the thin portion 3d are formed of a high-hardness rubber material.

Figure 12:
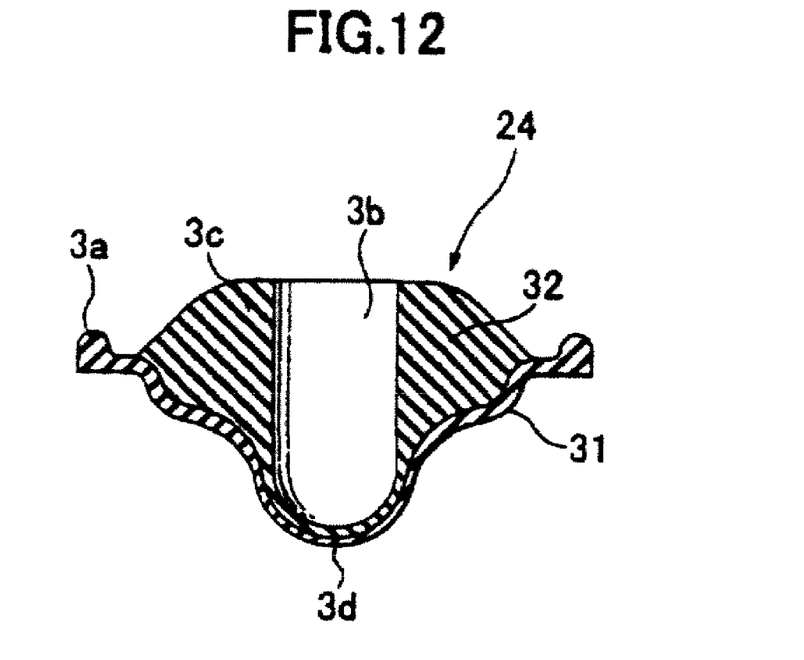
FIG. 12 a longitudinal sectional view of a thick sealing member of a fifth embodiment of the present invention.

FIG. 12 is a longitudinal sectional view of a thick sealing member 24 according to a fifth embodiment of the present invention. The thick sealing member 24 of the fifth embodiment comprises a lower surface of the thick sealing member (a rib 3a, a lower side of a thick portion 32 and a lower side of a thin portion 3d) made of a high-hardness rubber material, and the rest of the thick sealing member 24 is made of a low-hardness rubber material. The lower surface of the thick sealing member is made of the high-hardness rubber material, and the high-hardness rubber material receives the pressure from the wax, and uniform pressure can be applied on the low-hardness rubber material.

Figure 13:
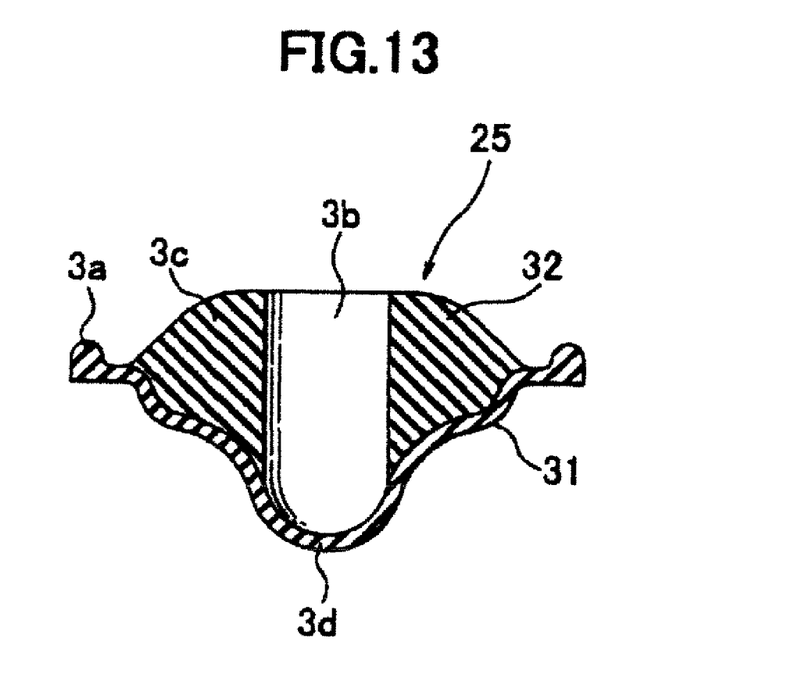
FIG. 13 a longitudinal sectional view of one variation of a thick sealing member of the fifth embodiment of the present invention.

FIG. 13 is a longitudinal sectional view of a thick sealing member 25 according to a variation of the fifth embodiment of the present invention. The thick sealing member 25 of this variation comprises a thin portion 3d entirely made of a high-hardness rubber material.

Although the foregoing description is directed to the embodiments in which either a upper or lower surface of the thick sealing member is made of the high-hardness rubber material, both the upper and lower surfaces thereof may be made of the high-hardness rubber material.

If the upper surface, the lower surface or all of the thin portion 3d is made of the high-hardness rubber material, preferably the thin portion 3d has a thickness in a range of 0.2 mm to 0.5 mm so that the thin portion 3d is sufficiently flexible, and can be deformed easily.

Further, if the thermally expandable component of the thermo-element has the thick sealing member (20-25) of the present invention, and the wax is the above-discussed wax mixture having an improved heat conduction which includes the copper foil and the low-melting point alloy, then the pressure working on the thick sealing member can be uniformly distributed, and thus the thick portion in the thick sealing member can be smoothly moved. As a result, an inexpensive durable thermo-element having a good response characteristic can be obtained.

Components in the attached drawings are designated as follows:
1 Casing
1a Sealing section
1b Crimping section
2 Wax (wax mixture)
3 Diaphragm
3a Rib
3b Piston insertion bore
3c Thick portion
3d Thin portion
4 Gummy fluid
5 Guide member
5a Contact surface
5b Guide tube
5c Groove
5d Base
6 Piston
7 Rubber piston
8 Protective sheet
9 Sleeve
10 Retaining plate
20 Thick sealing member
31 High-hardness portion
32 Low-hardness portion

What is claimed is:

1. A thermo-element including a thermally expandable component made of a wax mixture which is expandable and contractible by a temperature change, expansion and contraction of said wax mixture causing a piston to move in and to move out, said thermo-element comprising:
a cylindrical casing, one end portion thereof being open for enclosing said wax mixture therein;
a cylindrical guide member which engages said one end portion of said casing;
a piston held inside said guide member so that said piston can slide freely; and
a thick sealing member arranged between said guide member and said wax mixture for enclosing said wax mixture in said casing and for moving-in and moving-out said piston, wherein
said thick sealing member is formed of a rubber elastomer;
said thick sealing member has a piston insertion bore formed in a central portion thereof for supporting one end portion of said piston;
said thick sealing member has a thin portion at a lower end portion of said piston insertion bore, an annular rib arranged at an outer peripheral region for sealing said wax mixture and a thick portion between said thin portion and said rib, the thick portion having a thickness greater than the thickness of the thin portion;

one surface of said thick portion is in contact with a contact surface of a base of said guide member and the other surface of said thick portion is in contact with said wax mixture; and as said wax mixture expands by a temperature change, said thick portion of said thick sealing member is deformed to be displaced to under portion of said piston, said thin portion is deformed convexly upward, and both said thick portion and said thin portion thus push up said piston.

2. A rubber elastomer thick sealing member used in a thermo-element, wherein a wax mixture expandable and contractible by a temperature change is used as a thermally expandable component, expansion and contraction of said wax mixture causing a piston to move in and to move out, said thick sealing member comprising:

a piston insertion bore formed in a central portion thereof for supporting one end portion of said piston;

a thin portion at a lower end portion of said piston insertion bore;

an annular rib arranged at an outer peripheral region; and a thick portion having a thickness greater than the thickness of the thin portion between said thin portion and said rib, wherein said thick portion is deformable by a pressure from said wax mixture, said thin portion is deformable convexly upward, and both said thick portion and said thin portion push up said piston.

3. A thick sealing member according to claim 2, wherein said rib and an upper surface of said thick portion are formed of a high-hardness rubber in a range of Hs 60-80 and the rest of the thick sealing member is formed of a low-hardness rubber in a range of Hs 2-40, which rubbers are integrally formed into said thick sealing member.

4. A thick sealing member according to claim 3, wherein further, an inner surface of said piston insertion bore is formed of a high-hardness rubber in a range of Hs 60-80.

5. A thick sealing member according to claim 2, wherein said rib and a lower surface of said thick portion are formed of a high-hardness in a range of Hs 60-80 and the rest of the thick sealing member is formed of a low-hardness rubber in a range of Hs 2-40, which rubbers are integrally formed into said thick sealing member.

* * * * *